July 28, 1959

J. S. MICHIE 2,896,480

CHANGE SPEED DEVICE

Filed Jan. 9, 1957

INVENTOR.
JOHN S. MICHIE
BY Toulmin & Toulmin
ATTORNEYS

July 28, 1959     J. S. MICHIE     2,896,480
CHANGE SPEED DEVICE

Filed Jan. 9, 1957     2 Sheets-Sheet 2

INVENTOR.
JOHN S. MICHIE
BY Toulmin & Toulmin

ATTORNEYS

United States Patent Office 2,896,480
Patented July 28, 1959

2,896,480

CHANGE SPEED DEVICE

John S. Michie, Springfield, Ohio, assignor to Robbins & Myers, Inc., Springfield, Ohio, a corporation of Ohio Application January 9, 1957, Serial No. 633,336

6 Claims. (Cl. 74—798)

This present invention relates to change speed devices and, more particularly, to a change speed device construction of small physical size which is adapted for large ratio speed changes.

It is frequently desirable to employ change speed devices in localities in which the physical size of the device is necessarily materially limited. Epicyclic gear trains and particularly the reverted trains afford large speed ratios, but due to the considerable plurality of bearings customarily employed in such units the physical size of the device is prohibitive for many applications. A primary object of the present invention is to provide a compact change speed device in which the physical size is maintained small by employing torque transmitting means, comprising the differential mechanism of the unit, as bearing means also.

According to one object of the invention there is provided in a change speed device, as components of the differential mechanism, compound rollers which function to support at least one of the power shafts of the device as well as to transmit power. Preferably the compound rollers are supported for rotation by a cage which is itself rotatably mounted.

Yet another object of the invention is the provision of a compact change speed device of simple and improved construction, which device is composed of but few simple readily assembled parts so constructed and arranged as to preclude the derangement of the same.

Other objects and advantages of the invention will become apparent from the following detailed description and accompanying drawings wherein.

Figure 1:
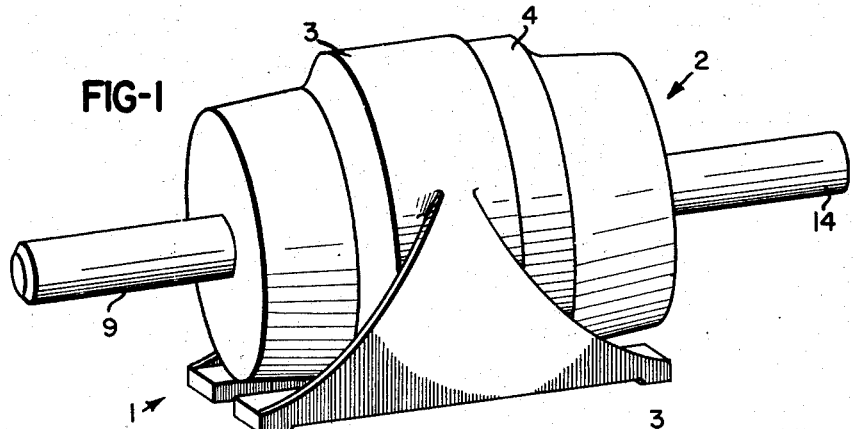
Figure 1 is a perspective view of a change speed device according to the invention.

Referring to the drawings in detail, the numeral 1 in Figure 1 designates a base which supports a housing indicated generally at 2. The housing is formed in two heads 3, 4, one of which is integral with the base; heads 3, 4 are secured together through the bolts 5, which pass through suitable matching threaded apertures in the heads. The housing 2 encloses a spacing 6 (Figure 2) which is adapted to be filled with oil through a hole which accommodates a removable plug 7 in the head 4. The head 4 is also provided at 8 with a drain plug for draining of the oil from the housing.

Figure 2:
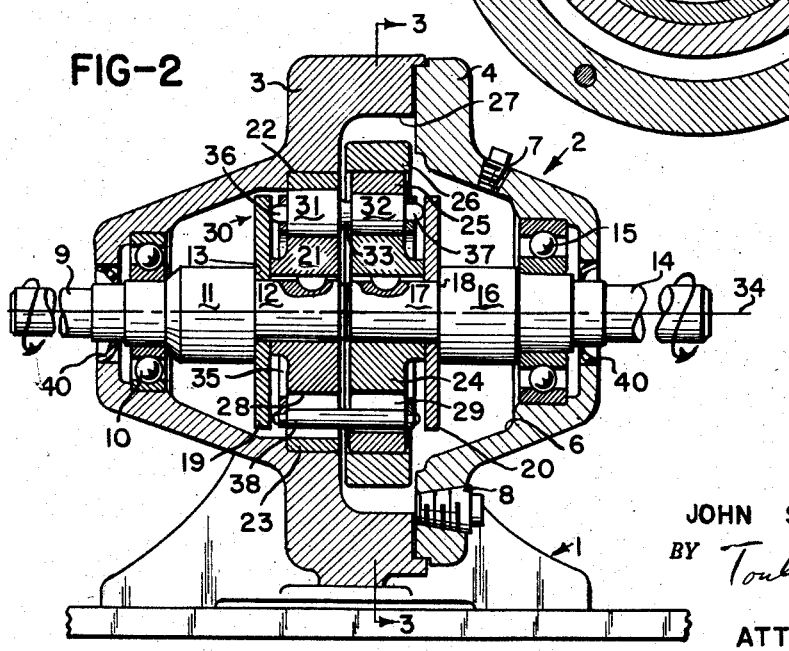
Figure 2 is a central longitudinal section thereof.

Leftwardly, as viewed in Figure 2, an input power shaft 9 passes inwardly of the housing through a suitable packing forming an oil seal, and is supported at its outer end by a ball bearing 10 retained by the housing. Internally of the housing the shaft 9 is provided with an enlarged portion 11 which abuts against the inner race of bearing 10; shaft 9 also has a narrowed down portion 12, and between portions 11 and 12 there is formed a shoulder 13.

An output power shaft 14 passes into the housing also through a suitable oil seal on a common axis with the shaft 9 and in opposed relation to the shaft 9; the inner ends of shafts 9 and 14 closely approach each other, as may be clearly seen from Figure 2.

A ball bearing 15 retained by the housing 2 supports an outer portion of the shaft 14. The shaft 14, similar to the shaft 9, is provided internally of the housing with an enlarged portion 16 abutting the inner race of bearing 15, and a narrowed down portion 17, which portions together form a shoulder 18. A cage retainer disk 19, to be referred to more particularly hereinafter, abuts against the shoulder 13 and a similar disk 20 is abutted against the shoulder 18.

Suitably keyed to the narrowed down portion 12 of the shaft 9 and abutting against the retainer disk 19 is a ring 21 made of an alloy steel which is hardened and ground and which forms a first inner race of a bearing for the shaft portion 12.

The outer race of this bearing is received in a recess 22 of the housing and comprises a hardened alloy steel ring 23. Ring 23 is fixed against rotation relative to the housing and is suitably press fit into the recess 22.

The shaft portion 17 is similarly provided with a hardened alloy steel ring 24 which forms a second inner race of a second bearing and which ring 24 is keyed to the shaft 17 for rotation therewith. Inner race 24 abuts the retainer disk 20. An annular ring 25 suitably of alloy steel and hardened and ground forms a second outer bearing race and is itself carried by an idler ring 26. The idler ring 26 is positioned closely to the heads 3, 4 in an annular recess 27 formed therebetween.

As shown in Figure 2 the first inner and outer races define therebetween an annular cavity 28, while the second inner and outer races define therebetween an annular cavity 29, which is of smaller radial dimension than the cavity 28. Positioned in the cavities are a plurality of compound rollers indicated generally at 30, each having a larger diameter end 31 and a smaller diameter end 32. Each roller is an integral unit and the ends are joined by a narrowed down throat portion 33.

The end 31 of the compound roller is of such a diameter that it is confined between the races 21 and 23, and the end 32 of each roller is of such a diameter that it is confined between the races 24, 25. The compound rollers are disposed annularly about the common axis of the shafts 9, 14 and are held in alignment on axes parallel to that of the common axis indicated at 34 by a cage 35 which is suitably of bronze or steel. The center distances of the annular cavities 28 and 29 from the common axis is the same but as noted the radial dimensions of the cavities differ to accommodate the differing diameters of the compound roller portions, which portions form essential elements of the differential mechanism for effecting a speed change.

End pins 36, 37 of the compound rollers are received by the cage 35 and the cage supports the compound rollers for rotation. Alignment of the rollers (Figure 2) is assisted by the abutment of the pins 36, 37 with the retaining disks 19, 20, respectively, which retain the rollers against axial movement. The cage is itself free for rotation about the common axis and the compound rollers rotate with the cage as well as about their own axes.

Figure 3:
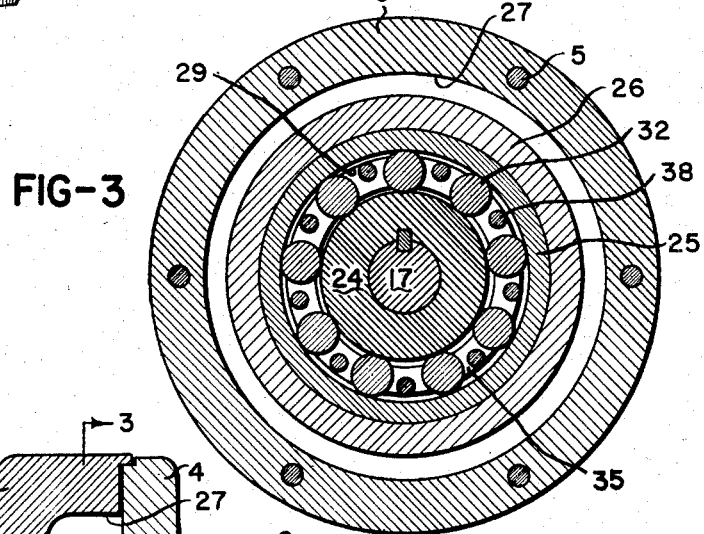
Figure 3 is a sectional view on line 3—3 of the device of Figure 2.

As shown most clearly in Figure 3 spacing pins 38 are provided on the cage between the rollers and are carried by the cage rotatably. Such pins are not necessary as the annular cavities may be completely filled with rollers, if such is desired. Normally it is preferable to reduce friction effects by inclusion of the spacing pins.

As will be noted from Figure 2 rotation of the input shaft 9 in the direction indicated by the arrow will occasion rotation of the compound roller 30 by reason of the contact of the race 21 with the roller end portion 31. Such contact causes the roller 30 to rotate on its own axis in an opposite direction to that of the shaft 9.

Since the outer race 23 is fixedly positioned the roller 30, together with the cage 35, will also be rotated about the axis of the input shaft 9 and in the same direction as that of the shaft 9. Since the portion 33 of the compound roller directly connects the large roller end 31 with the smaller roller end 32, the smaller end 32 will be turned on its own axis in the same direction as the roller end 31 and in an opposite direction to the shaft 9. Also the roller end 32 will be carried with the roller 31 by the cage 35 about the common axis of the input and output shafts and in the same direction of rotation as shaft 9.

The rotation of roller 32 and cage 35 occasions rotation of the second inner race 24, causing the shaft portion 17 and the output shaft 14 itself to be rotated. The outer bearing race 25 and the idler ring 26 will run free and will assist in retaining the roller end 32 positioned relative to the common axis and will provide for bearing support of the shaft portion 17. Thus the combination of the inner races, the outer races, and the compound rollers confined between the races provides a torque transmitting means which includes a differential mechanism, and which combination also functions as a bearing for the input and output shafts and their extensions.

It is to be particularly noted that the compoupnd rollers are retained against radial movement relative to the common axis on which the input and output shafts are provided and are also securely retained against longitudinal misalignment by the retaining disks 19 and 20.

It is further to be noted that with the construction shown in Figures 2 and 3 the output speed in revolutions per minute may be greater or lesser than the input speed by exercising a choice of diameters of the compound rollers.

Assembly and disassembly of the components of the device of Figures 1 to 3, inclusive, is readily achieved. The cage 35 carrying the compound rollers is axially push-fitted through the annular cavity 28 between the races 21, 23 and the ends 36 of the rollers are brought into abutment with disc 19.

Thereafter the idler ring 26 and outer race 25 are fitted over the second end of the compound rollers; then the housing head 4 with shaft 14, inner race 24, and disc 20 positioned are abutted against the ends 37 of the rollers and the heads are secured together. Most suitably an interference fit is provided between the inner race 24 and the rollers 32. Such arrangement provides a compact structure which is readily maintained in operable condition.

Figure 4:
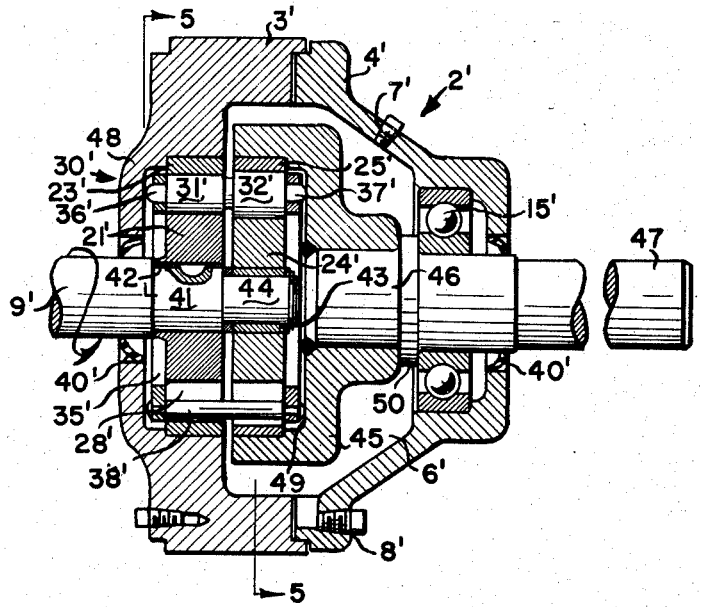
Figure 4 is a longitudinal section showing a modified arrangement of the change speed device of invention.

Referring now to Figure 4, there is illustrated a modification of the structure of invention which is particularly adapted to a combination with a motor casing. Similar numerals, but primed, are employed to designate corresponding parts of the prior embodiments insofar as practical.

Thus the heads 3', 4' are retained together by the bolts 5' and define an interior oil well spacing 6', the head 4' being provided with a filling oil inlet 7' and a drain 8'. The input shaft 9' in this instance is the drive shaft of the motor (not shown) and the motor bearing (not shown) provides for support of the outer end of the shaft.

The shaft 9' passes into the head 3' through packing 40'; similar to the packing 40 shown in Figure 2. Shaft 9' has a narrowed down portion 41 to which is keyed an internal ring or race 21', the ring or race abutting the shoulder 42 of the shaft.

The outer race 23' forms, with the inner race 21', an annular cavity 28' which receives the smaller end 31' of compound rollers as indicated generally at 30'. Second inner and outer races, respectively, designated at 24', 25', define an annular cavity in which the larger end 32' of the compound roller 30' is confined.

The inner race 24' is supported for rotation on a suitable bearing, such as an oil-lite bronze bearing 43, which bearing is force fitted to the inner end 44 of the shaft 9' and provided at either end with thrust washers.

A spider 45 keyed to the interior shaft portion 46 of the output shaft 47 receives in a recess thereof the outer race 25' and fixedly retains the same. The fit of the race 25' to the spider 45 is preferably a press fit.

The cage 35' mounts the plurality of rollers 30' and the rollers are confined against axial movement between the spider 45 and the wall portion 48 of the head 3'. Pins 36', 37' carried by the compound rollers 30' abut the wall 48 leftwardly and abut the internal wall 49 of the spider 45 rightwardly, as shown in Figure 4. However, the compound rollers are free to rotate on their own axes and with the cage 35', the contact of the pins 36', 37' and the walls 48, 49 being merely sufficient to retain the rollers against longitudinal movement. The shaft 47 extends well into the housing on a common axis with the motor shaft and the interior end of the shaft 47 is in close proximity to the end of the shaft 9'. A disk 50 welded to the shaft abuts the inner race of the bearing 15' and engages against the spider 45 to minimize friction on the spider to permit free rotation thereof.

Figure 5:
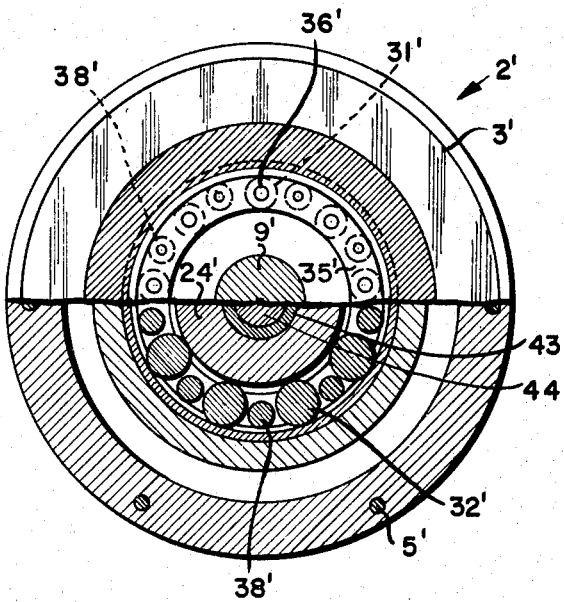
Figure 5 is a view partially in section taken on line 5—5 of Figure 4.

In the operation of the structures of Figures 4 and 5, the interior end of shaft 9', constituted of portions 41, 44, is securely supported by the combination of the inner races 21', 24', the outer races 23', 25', and the rollers 30'.

In the operation of the device of Figure 4 power is transmitted through shaft 9', the inner race 21' to compound roller end 31'. When the direction of rotation is that indicated by the arrow on the shaft 9', each roller 31' will rotate in an opposite direction on its own axis, but the cage 35' will tend to move in the same rotational direction as the shaft 9'. Each roller end 32' will rotate on its own axis in the same direction as the end 31', and will be carried by the cage 35' in the same rotational direction as the shaft 9'.

Thus the outer race 25' and with it the spider 45 will tend to be carried in the same rotational direction as the shaft 9'. However, the speed of rotation of the spider and of the shaft 47, to which it is attached, will be materially reduced over that of the rotational speed of the shaft 9'.

Slightly different diameters at the ends 31', 32' of the compound rollers provide for the change in rotational speed.

The direction of rotation of the output shaft 47 may be the same as that of the input shaft or it may be in the reverse direction, depending upon the choice of diameters on the compound rollers.

The structure of Figures 4 and 5 is assembled and disassembled in a manner similar to that described in connection with the previous figures. This arrangement, however, is somewhat more compact, as the housing itself serves to maintain the rollers and cage against axial movement.

The torque transmitting solid rollers of the specific embodiments disclosed are essentially planet wheels and are most suitably hardened and ground as are the races for resistance to wear.

It will be understood that this invention is susceptible to modification in order to adapt it to different usages and conditions and accordingly, it is desired to comprehend such modifications within this invention as may fall within the scope of the appended claims.

I claim:

1. A change speed device having a housing, input and output power shafts on a common axis and extending into the housing in opposed relation, a first inner race secured on the input shaft, a first outer race secured against rotation relative to the housing and defining with the first inner race an annular cavity about the common axis, a second inner race supported on one of the shafts, a second outer race annularly disposed about the second inner race and forming with the second inner race an annular cavity about the common axis, said cavities being the same center distance from the common axis but of differing radial dimensions, compound rollers in the cavities engaged between the races and rotatable about the common axis and about axes parallel to the common axis, and means securing the output shaft to one of the said second races.

2. A change speed device having a housing, input and output power shafts on a common axis and extending into the housing in opposed relation, a first inner race secured on the input shaft for rotation therewith, a first outer race secured against rotation relative to the housing and defining with the first inner race an annular cavity about the common axis, a second inner race secured to the output shaft for rotation therewith, a second outer race annularly disposed about the second inner race and forming with the second inner race an annular cavity disposed about the common axis, said annular cavities being the same center distance from the common axis but of differing radial dimensions, compound rollers in the cavities engaged between the races and rotatable about the common axis and about axes parallel to the common axis, and a ring retaining the second outer race against radial movement and freely rotatable about the common axis.

3. A change speed device having a housing, input and output power shafts on a common axis and extending into the housing in opposed relation, a first inner race secured on the input shaft for rotation therewith, a first outer race secured against rotation relative to the housing and defining with the first inner race an annular cavity about the common axis, a second inner race supported for rotation on said input shaft relative to said input shaft, a second outer race annularly disposed about the second inner race and forming with the second inner race an annular cavity, said annular cavities being the same center distance from the common axis but of differing radial dimensions, compound rollers in the cavities engaged between the races and rotatable about the common axis and about axes parallel to the common axis, and a spider secured to the output shaft and also secured to the second of the outer races for rotation therewith.

4. A change speed device having a housing, input and output power shafts on a common axis extending into the housing in opposed relation, a spider secured on the output shaft within the housing, a plurality of compound rollers annularly disposed about the common axis and having their axes parallel to the common axis, said rollers being mounted for rotation about the common axis and about their own axes and being retained against axial movement by said spider and said housing, races annular to the common axis engaging and confining the rollers therebetween, one of said races being supported by said housing and fixed against rotation relative to the housing, and another of said races being rotatable with said spider, said rollers and races providing support for the shafts and forming a power transmission train connecting the input with the output shaft.

5. A change speed device having a two part housing, an input shaft carried by a first part of the housing and an output shaft carried by a second part of the housing, the shafts having a common axis and extending into the housing in opposed relation, said first housing part having an interior wall, a first outer race supported by the first housing part against rotation relative to the housing and annularly disposed about the input shaft, a first inner race carried on the input shaft for rotation therewith, said inner and outer races forming an annular cavity therebetween, a cage, a plurality of annularly disposed compound rollers supported by said cage, said cage and rollers being axially fitted through said annular cavity between said races with said rollers having ends thereof in abutment with said interior housing wall, said races confining first portions of said compound rollers, a spider carried by said output shaft for rotation therewith, said spider abutting other ends of said rollers, a second inner race carried by said input shaft and rotatable with respect to the shaft, a second outer race carried by the spider and rotatable therewith, said second and inner outer races forming an annular cavity and confining the second portions of said compound rollers therein.

6. A change speed device having a two part housing, an input shaft carried by a first part of the housing and an output shaft carried by a second part of the housing, the shafts having a common axis and extending into the housing in opposed relation, shoulders on each of said shafts, a disk on each shoulder, and torque transmitting means between the disks supporting and connecting the input and output shafts, said torque transmitting means comprising a first inner race secured on the input shaft, a second inner race secured on the output shaft, a first outer race annularly disposed about the first inner race and supported by said housing against rotation relative to the housing, a rotatable cage, a plurality of axially extending compound rollers rotatably carried by the cage, a first portion of the compound rollers being engaged between said first inner and outer races, a second outer race annularly disposed about the second inner race, second portions of said compound rollers being engaged between said second inner and outer races, a freely rotatable ring supporting said second outer race and retaining said race against radial movement, opposed ends of said compound rollers being in abutment with said disks and rotatable with said cage about the common axis between said disks.

References Cited in the file of this patent

UNITED STATES PATENTS

| | | |
|---|---|---|
| 2,484,605 | Boucher | Oct. 11, 1949 |
| 2,745,298 | Braunagel et al. | May 15, 1956 |

FOREIGN PATENTS

| | | |
|---|---|---|
| 6,394 | Sweden | Aug. 20, 1894 |